US008471795B2

(12) United States Patent
Chen et al.

(10) Patent No.: US 8,471,795 B2
(45) Date of Patent: Jun. 25, 2013

(54) METHOD OF DRIVING PIXELS AND DISPLAYING IMAGES ON A DISPLAY DEVICE

(75) Inventors: Yu-Yeh Chen, Tainan County (TW); Chia-Hang Lee, Tainan County (TW); Hung-Yu Lin, Tainan County (TW)

(73) Assignee: Chimei Innolux Corporation, Miao-Li County (TW)

( * ) Notice: Subject to any disclaimer, the term of this patent is extended or adjusted under 35 U.S.C. 154(b) by 1155 days.

(21) Appl. No.: 11/745,799

(22) Filed: May 8, 2007

(65) Prior Publication Data

US 2007/0258104 A1 Nov. 8, 2007

(30) Foreign Application Priority Data

May 8, 2006 (TW) .............................. 95116280 A

(51) Int. Cl.
*G09G 3/36* (2006.01)
*G09G 5/00* (2006.01)
*G09G 5/10* (2006.01)
*G06F 3/038* (2006.01)

(52) U.S. Cl.
USPC ................ 345/89; 345/87; 345/204; 345/690

(58) Field of Classification Search
USPC .................................... 345/87–104, 204–699
See application file for complete search history.

(56) References Cited

U.S. PATENT DOCUMENTS

| | | | | |
|---|---|---|---|---|
| 6,970,148 | B2 * | 11/2005 | Itoh et al. | 345/63 |
| 7,002,540 | B2 * | 2/2006 | Aoki | 345/89 |
| 2004/0196229 | A1 * | 10/2004 | Ham | 345/87 |
| 2005/0184949 | A1 * | 8/2005 | Kamimura | 345/98 |
| 2005/0253785 | A1 * | 11/2005 | Miyasaka et al. | 345/63 |

* cited by examiner

*Primary Examiner* — Sumati Lefkowitz
*Assistant Examiner* — David Tung
(74) *Attorney, Agent, or Firm* — Lowe Hauptman Ham & Berner, LLP

(57) ABSTRACT

A method for driving a pixel includes driving the pixel with a first gray level and a second gray level within a first sub-frame period and a second sub-frame period of a first frame period, respectively, driving the pixel with a third gray level and a fourth gray level within a first sub-frame period and a second sub-frame period of a second frame period, respectively, and adjusting the third gray level and the fourth grey level such that the luminance of the adjusted fourth grey level is similar to the luminance of the second grey level.

13 Claims, 15 Drawing Sheets

40

| Target grey level | First substitute grey level | Second substitute grey level |
|---|---|---|
| 0 | 0 | 0 |
| 1 | 2 | 0 |
| ⋮ | ⋮ | ⋮ |
| 149 | 245 | 0 |
| 150 | 250 | 0 |
| 151 | 255 | 0 |
| 152 | 255 | 5 |
| ⋮ | ⋮ | ⋮ |
| 252 | 255 | 220 |
| 253 | 255 | 230 |
| 254 | 255 | 240 |
| 255 | 255 | 250 |

Fig. 4 Prior Art

METHOD OF DRIVING PIXELS AND DISPLAYING IMAGES ON A DISPLAY DEVICE

This application claims the benefit of Taiwan Application Serial No. 095116280, filed May 8, 2006, the entirety of which is incorporated herein by reference.

TECHNICAL FIELD

The disclosure relates to a method of displaying images, and more particularly, to a method of displaying images with reduced motion blur.

BACKGROUND

As the liquid crystal display (LCD) technology advances, LCD televisions are gradually replacing cathode ray tube televisions in the global market. However LCD televisions are less responsive to motion pictures than CRT televisions, thus motion blur often occurs at the edges of moving objects on LCD TVs. In order to reduce the motion blur, a clock multiplier factor has been used.

FIG. 1 shows two adjacent pixels 101, 102 displaying gray levels A and B in a time frame Tf. FIG. 2 shows the two adjacent pixels 101, 102 displaying gray levels A and B in the first half of the time frame Tf, and displaying black images (gray level 0) in the second half of the time frame Tf by doubling the clock multiplier factor. According to an eye-tracking model, this will effectively reduce the blur width of motion blur by roughly a half. However, since the known method displays the correct gray levels only in half a period instead of a full period, the luminance of the picture is reduced by half and the image quality is sacrificed.

To minimize the reduction of luminance, another method has been provide to reduce the blur width of motion blur while the luminance is rarely affected. In FIG. 3, when the pixels 101, 102 receive target gray levels A and B respectively, the pixel 101 displays substitute gray levels A' and C in the time frame Tf sequentially, and the pixel 102 displays substitute gray levels B' and D in the time frame Tf sequentially. The average luminance of the substitute gray levels A' and C is similar to the luminance of the target gray level A. The average luminance of the substitute gray levels B' and D is similar to the luminance of the target gray level B. FIG. 4 shows a table 40 listing the substitute gray levels for each target gray level for the method of FIG. 3. According to FIGS. 3 and 4, when a pixel receives, e.g., a target gray level of 150 for a time frame, the pixel will display substitute gray levels of 250 and 0 sequentially each for half a time frame. When a pixel receives, e.g., a target gray level of 151 for a time frame, the pixel will display substitute gray levels of 255 and 0 sequentially each for half a time frame. As shown in the table 40, when a received target gray level is smaller than 152, a black image with a gray level of 0 will substitute for half a time frame so that the luminance of the two substitute gray levels will be similar to the luminance of the received target gray level. When a received target gray level is greater than 150, a white image with a gray level of 255 will substitute for half a time frame so that the luminance of the two substitute gray levels will be similar to the luminance of the received target gray level. Frequently, gray levels of adjacent pixels are very close. Thus, if the received target gray levels of both of the pixels 101, 102 are smaller than 152, then the substitute gray levels C, D are both 0. If the received target gray levels of both of the pixels 101, 102 are greater than 150, then the substitute gray levels A', B' are both 255. In both situations, the blur width of the motion blur will be reduced approximately by half without impairing the overall luminance. FIG. 5 illustrates the table 40 in a coordinate format. When a received target gray level is not smaller than g51, the first substitute gray level is 255. When a received gray level is not greater than g51, the second substitute gray level is 0. Further in the known method, the sequence of the first and second substitute gray levels can be reversed as long as the sequence is consistent throughout the picture being displayed on the LCD TV. Moreover, g51 can be 151 or another number.

FIGS. 2 and 3 disclose two common methods for reducing the blur width of motion blur. Both methods display a large amount of black images, which may cause problems to the pixel luminance. In particular, after a pixel displays a black image, if a following image has a high grey level, the pixel is likely to display the following image at a luminance lower than the expected luminance. After a pixel displays a high grey level image, if a following image is supposed to be a black image, the pixel is likely to display the following image at a luminance higher than the expected luminance.

FIG. 6 shows the luminance displayed by a pixel during several time frames from t60 to t69 as implemented by the method of FIG. 4. During the time frames from t60 to t64, the pixel receives a target grey level 100 twice. According to the table 40, the pixel should display images at substitute grey levels 150, 0, 150, 0 sequentially. During the time frames from t65 to t69, the pixel receives a target grey level 151 twice. According to the table 40, the pixel should display images at substitute grey levels 255, 0, 255, 0 sequentially. However due to the slow response of the liquid crystal material, the luminance L1 at t62, t64 (corresponding to the substitute grey level of zero) is lower than the luminance L2 at t67, t69 (also corresponding to the substitute grey level of zero) by Δy1.

FIG. 7 shows the luminance displayed by the pixel during several time frames from t70 to t79 as implemented by the method of FIG. 4. During the frames from time t70 to t74, the pixel receives a target grey level 151 twice. According to the table 40, the pixel should display images at substitute grey levels 255, 0, 255, 0 sequentially. During the frames from time t75 to t79, the pixel receives a target grey level 200 twice. According to the table 40, the pixel should display images at substitute grey levels 255, 100, 255, 100 sequentially. However due to the slow response of the liquid crystal material, the luminance L4 at t71, t73 (corresponding to the substitute grey level of 255) is lower than the luminance L5 at t76, t78(also corresponding to the substitute grey level of 255) by Δy2.

FIGS. 6 and 7 show that the slow response of the liquid crystal material is one reason why the LCD's pixels are unable to display images at the desired luminance. For example, the luminance at t67, t69 fails to reach the desired level of L1, and the luminance at t71, t73 fails to reach the desired level of L5. This has caused distortion to the images displayed by the pixel since the pixel is unable to display the images both without motion blur and with the desired luminance.

SUMMARY

According to an embodiment of the present invention, a pixel driving method comprises receiving a first target grey level to be displayed by a pixel, generating a first higher grey level and a first lower grey level according to the first target grey level, displaying the first higher grey level and the first lower grey level instead of the first target grey level, receiving a second target grey level to be displayed by the pixel, generating a second higher grey level and a second lower grey level according to the second target grey level, and displaying the second higher grey level and the second lower grey level instead of the second target grey level. The second higher grey level is greater than the first higher grey level. The second lower grey level is smaller than the first lower grey level.

According to another embodiment of the present invention, a pixel driving method comprises receiving a first target grey level to be displayed by a pixel, generating a first higher grey level and a first lower grey level according to the first target grey level, displaying the first higher grey level and the first lower grey level instead of the first target grey level, receiving a second target grey level to be displayed by the pixel, generating a second higher grey level and a second lower grey level according to the second target grey level, and displaying the second higher grey level and the second lower grey level instead of the second target grey level. The second higher grey level is smaller than the first higher grey level. The second lower grey level is greater than the first lower grey level.

According to another embodiment of the present invention, a pixel driving method for driving a pixel comprises driving the pixel with a first grey level and a second grey level in a first sub-frame period and a second sub-frame period of a first frame period respectively, driving the pixel with a third grey level and a fourth grey level in a first sub-frame period and a second sub-frame period of a second frame period respectively, and adjusting the third and fourth grey levels to reduce a luminance difference of the second and fourth grey levels.

Additional aspects and advantages of the disclosed embodiments are set forth in part in the description which follows, and in part are apparent from the description, or may be learned by practice of the disclosed embodiments. The aspects and advantages of the disclosed embodiments may also be realized and attained by means of the instrumentalities and combinations particularly pointed out in the appended claims.

BRIEF DESCRIPTION OF THE DRAWINGS

FIG. 4 shows a table listing the substitute gray levels for each target gray level for use in the method of FIG. 3.

DETAILED DESCRIPTION OF EMBODIMENTS

In the following detailed description, for purposes of explanation, numerous specific details are set forth in order to provide a thorough understanding of the embodiments. It will be apparent, however, that the embodiments may be practiced without these specific details. In other instances, well-known structures and devices are schematically shown in order to simplify the drawings. Disclosed embodiments of the present invention provide a pixel driving method which takes the slow response of the liquid crystal material into consideration. By corresponding a target grey level to substitute grey levels which are different yet attainable by the liquid crystal material, overall luminance can be maintained and motion blur can be reduced when displaying images.

Figure 6:
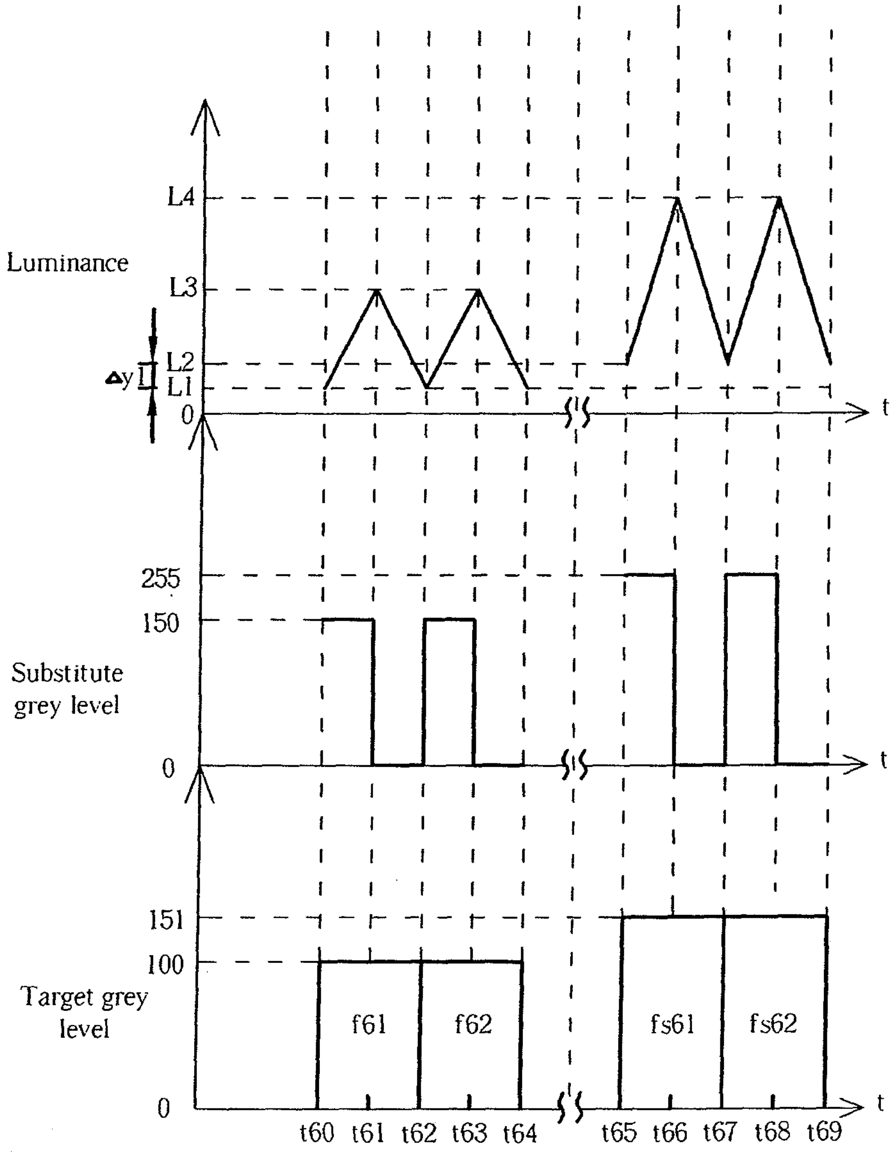
Fig. 6 Prior Art
FIG. 6 is a time chart that shows the luminance displayed by a pixel during several time frames as implemented by the method of FIG. 4.
Figure 8:
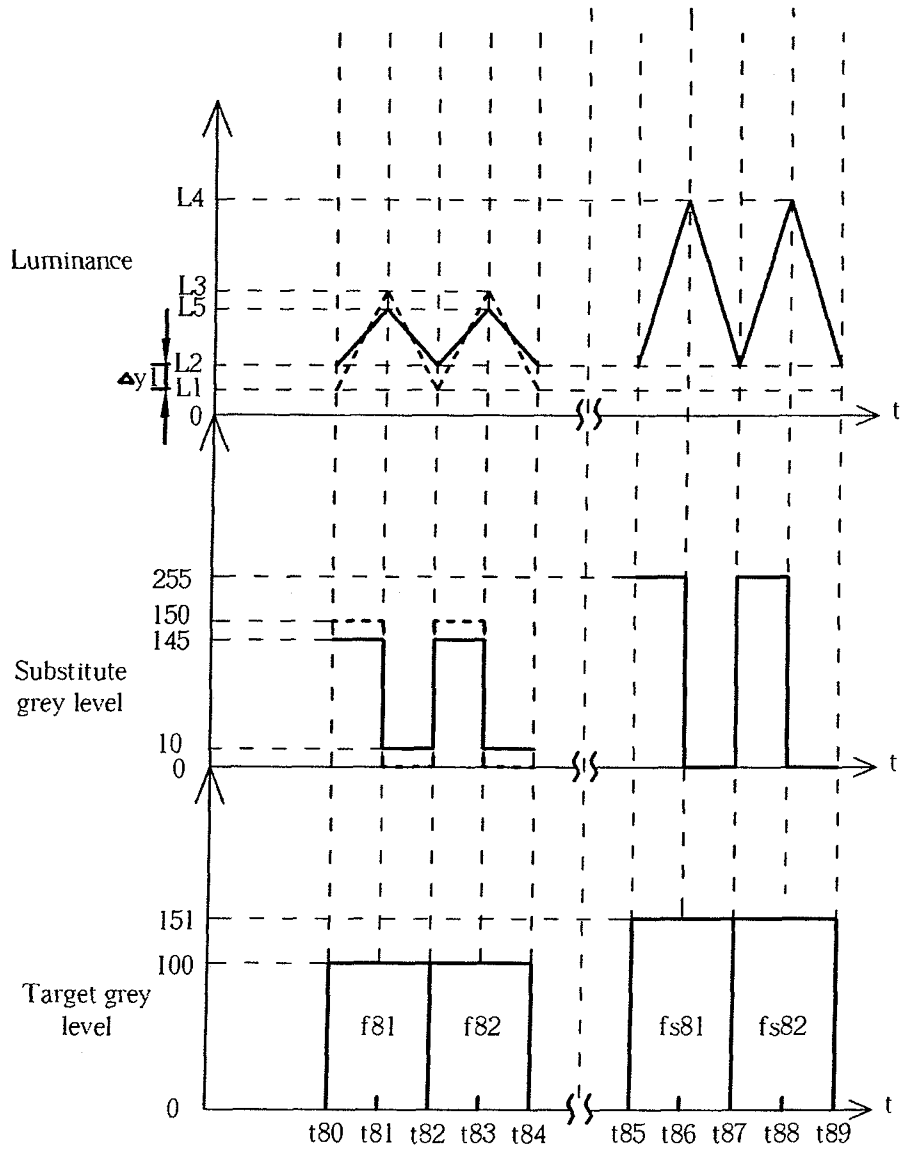
FIG. 8 is a time chart that shows the luminance displayed by a pixel during several time frames according to a pixel driving method of an embodiment of the present invention.

FIG. 8 shows the luminance displayed by a pixel during several time frames from t80 to t89 according to a pixel driving method of an embodiment of the present invention. Like FIG. 6, during the time frames from t80 to t84, the pixel receives a target grey level 100 twice. During the time frames from t85 to t89, the pixel receives a target grey level 151 twice. In order to equalize the luminance of the pixel at time t82 (the end of time frame f81) and t84 (the end of time frame f82) to the luminance of the pixel at time t87 (the end of time frame fs81) and t89 (the end of time frame fs82), instead of displaying images at grey levels 150, 0, 150, 0 sequentially from time t80 to t84 as indicated by FIG. 4 and illustrated in dotted line in FIG. 8, the pixel displays images at modified substitute grey levels 145, 10, 145, 10 sequentially. Despite this modification in substitute grey levels, the accumulated luminance during the time frames from t80 to t84 remains unchanged, i.e., about the same as the accumulated luminance during the time frames from t60 to t64 shown in FIG. 6 and illustrated by dotted line in FIG. 8. However, the luminance of the pixel at time t82 (the end of time frame f81) and t84 (the end of time frame f82) will be at grey level L2, i.e., equal to the luminance of the pixel at time t87 (the end of time frame fs81) and t89 (the end of time frame fs82). As a result, no image distortion is observed, unlike the method of FIGS. 4 and 6.

Figure 7:
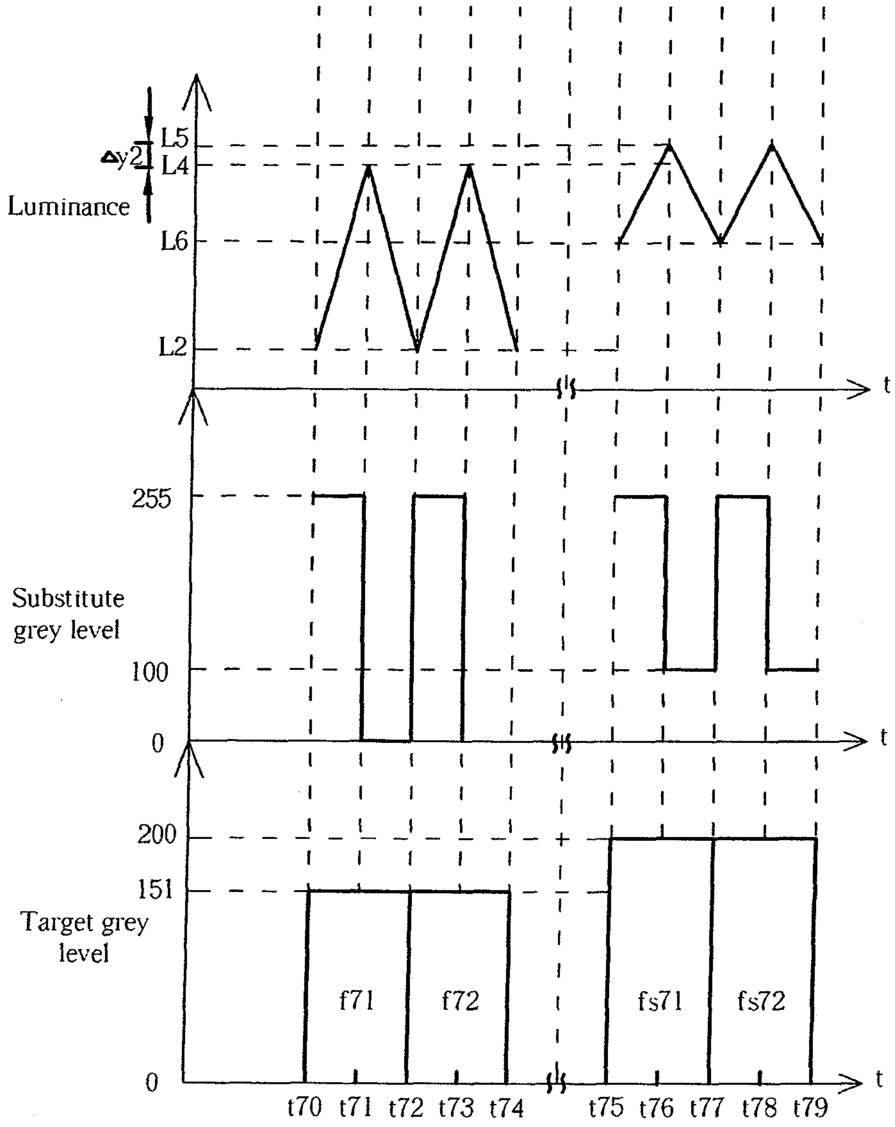
Fig. 7 Prior Art
FIG. 7 is a time chart that shows the luminance displayed by the pixel during other time frames as implemented by the method of FIG. 4.
Figure 9:
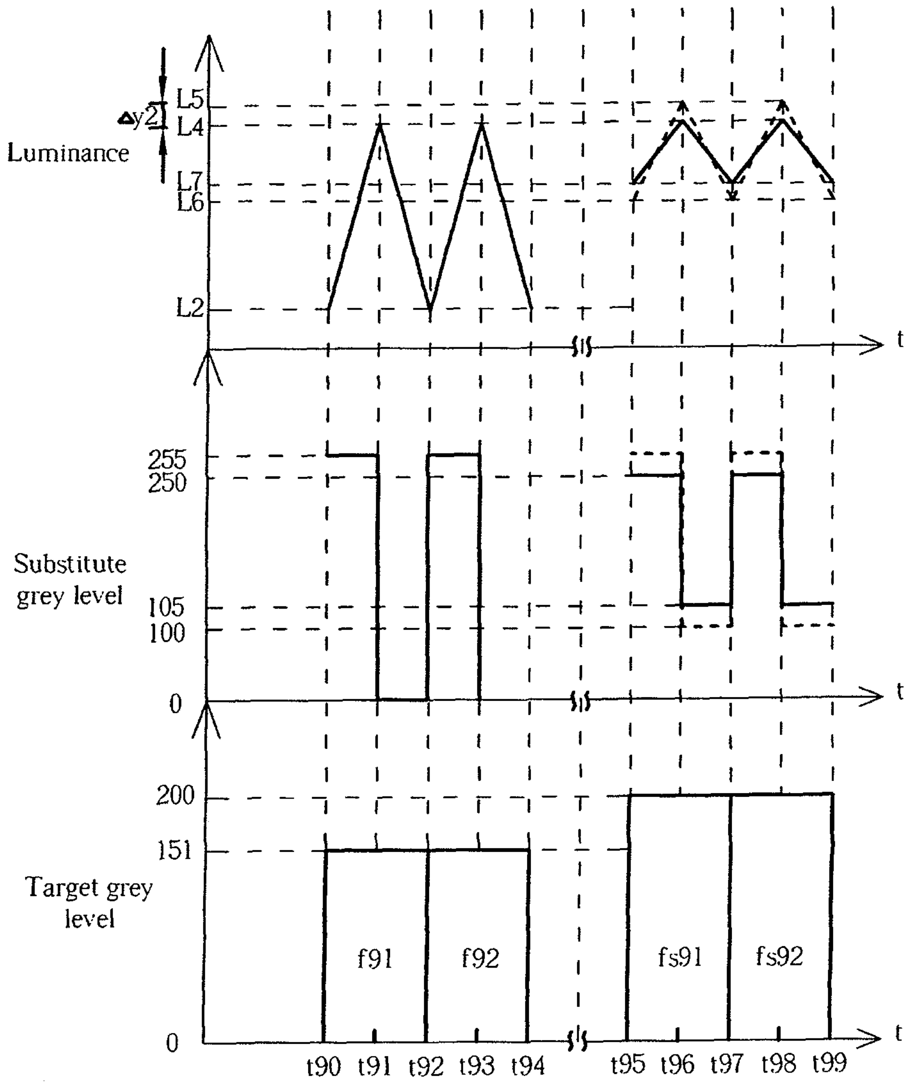
FIG. 9 is a time chart that shows the luminance displayed by a pixel during other time frames according to the pixel driving method of the embodiment of the present invention.
Figure 10:
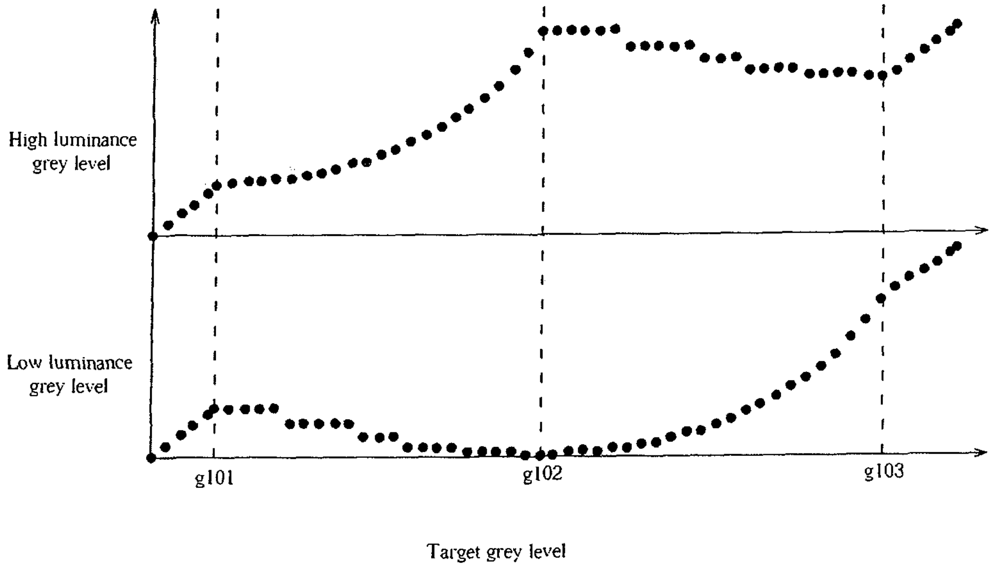
FIGS. 10 to 13 are graphs that illustrate substitute grey levels versus target grey levels in a coordinate format according to four different embodiments of the present invention.

FIG. 9 shows the luminance displayed by a pixel during several time frames from t90 to t99 according to the pixel driving method of the embodiment of the present invention. Like FIG. 7, during the time frames from t90 to t94, the pixel receives a target grey level 151 twice. During the time frames from t95 to t99, the pixel receives a target grey level 200 twice. In order to equalize the luminance of the pixel at time t91 (the middle of time frame f91) and t93 (the middle of time frame f92) to the luminance of the pixel at time t96 (the middle of time frame fs91) and t98 (the middle of time frame fs92), instead of displaying images at grey levels 255, 100, 255, 100 sequentially from time t95 to t99 as indicated by FIG. 4 and illustrated in dotted line in FIG. 9, the pixel displays images at modified substitute grey levels 250, 105, 250, 105 sequentially. Despite this modification in substitute grey levels, the accumulated luminance during the time frames from t95 to t99 remains unchanged, i.e., about the same as the accumulated luminance during the time frames from t75 to t79 shown in FIG. 7 and illustrated by dotted line in FIG. 9. However, the luminance of the pixel at time t91 (the middle of time frame f91) and t93 (the middle of time frame f92) will be at grey level L4, i.e., equal to the luminance of the pixel at time t96 (the middle of time frame fs91) and t98 (the middle of time frame fs92). As a result, no image distortion is observed, unlike the method of FIGS. 4 and 7.

Figure 1:
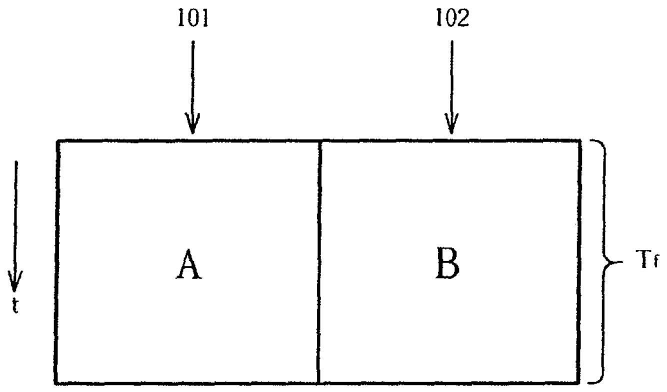
Fig. 1 Prior Art
FIG. 1 is a schematic view that shows two adjacent pixels displaying gray levels A and B in a time frame according to a known method.
Figure 2:
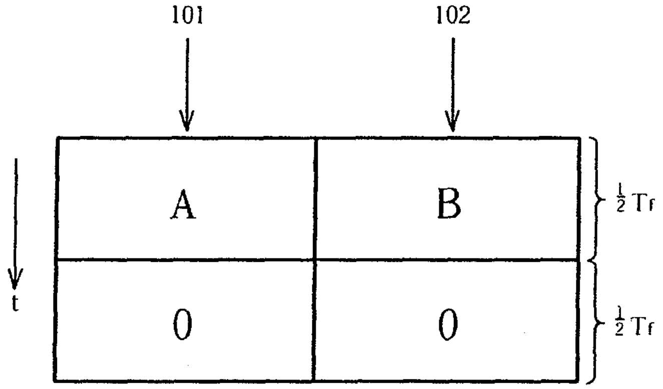
Fig. 2 Prior Art
FIG. 2 is a schematic view that shows two adjacent pixels displaying gray levels A and B in the first half of a time frame, and displaying black images in the second half of the time frame according to another known method.
Figure 3:
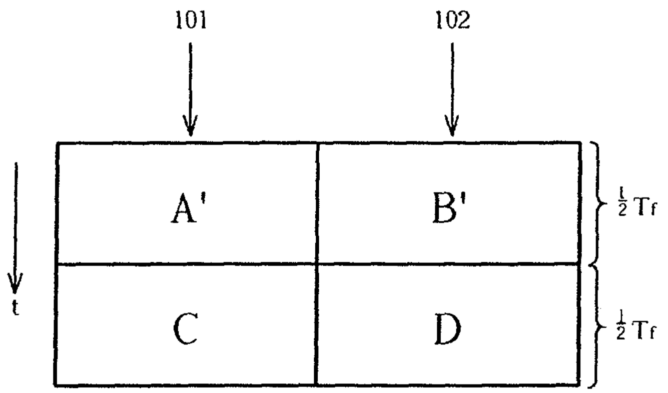
Fig. 3 Prior Art
FIG. 3 is a schematic view that shows two adjacent pixels displaying gray levels A' and B' in the first half of a time frame, and displaying gray levels C and D in the second half of the time frame according to the a further known method.
Figure 5:
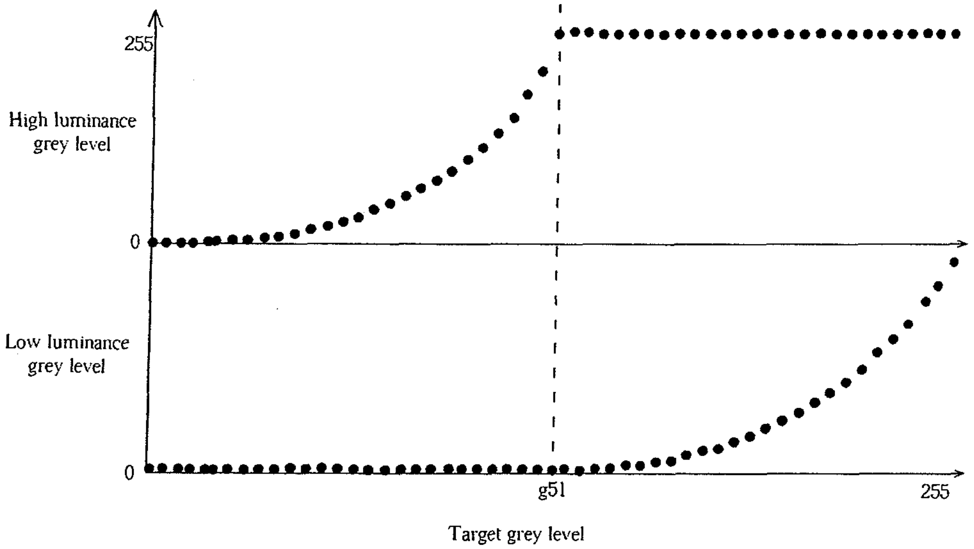
Fig. 5 Prior Art
FIG. 5 illustrates the table in FIG. 4 in a coordinate format.

FIGS. 10 to 13 illustrate substitute grey levels versus target grey levels in a coordinate format according to four different embodiments of the present invention. The horizontal axes of the four graphs show the target grey levels. The vertical axes of the four graphs show the substitute grey levels to be displayed. For each target grey level, two substitute grey levels are displayed As shown in each of FIGS. 10 to 13, one substitute grey level has a higher luminance, while the other substitute grey level has a lower luminance. The substitute grey levels are determined in a way that their accumulated luminance for each target grey level is about the same as the accumulated luminance provided by the substitute grey levels in FIG. 5, and the luminance for the substitute grey levels are made similar to each other so as to minimize the blur width of motion blur.

Further, in the embodiments of FIGS. 10 to 13, when the target grey level is greater than a predetermined value (e.g., g103, g113, g122, g132) or is smaller than a predetermined value (e.g., g101, g111, g121, g131), its corresponding substitute grey levels may be assigned in a manner different from other target values. For instance in FIG. 10, when the target value is between g101 and g103, one of its corresponding substitute grey levels tends to increase with the target value while the other tends to decrease, or vice versa. However, when the target value is greater than g103, both of its corresponding substitute grey levels increase with the target value. When the target value is smaller than g101, both of its corresponding substitute grey levels decrease with the target value.

Figure 11:
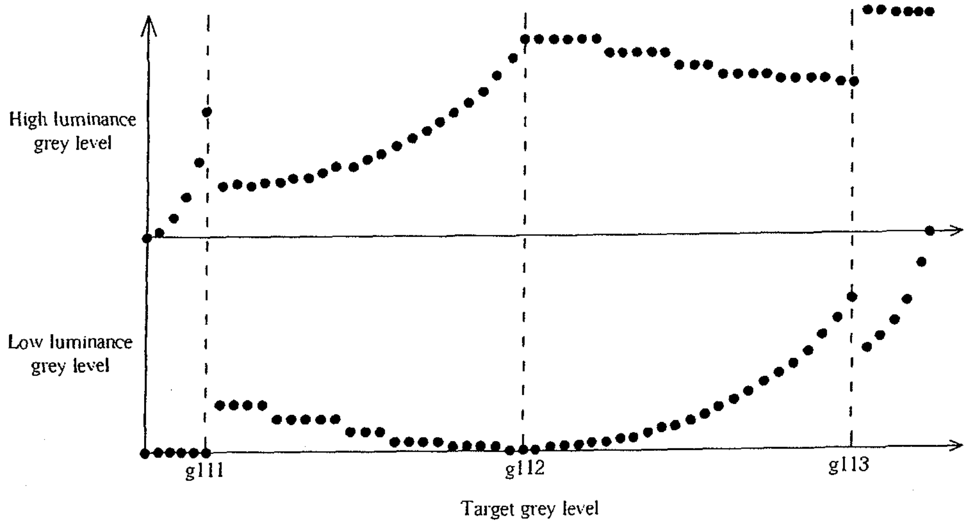

In FIG. 11, when the target value is greater than g113, its corresponding substitute grey level for lower luminance tends to increase significantly with the target value while its corresponding substitute grey level for higher luminance tends to remain constant. When the target value is smaller than g111, its corresponding substitute grey level for higher luminance tends to increase significantly with the target value while its corresponding substitute grey level for lower luminance tends to remain constant. The substitute grey levels for target values between g111 and g113 vary similarly to the substitute grey levels for target values between g101 and g103 in FIG. 10.

Figure 12:
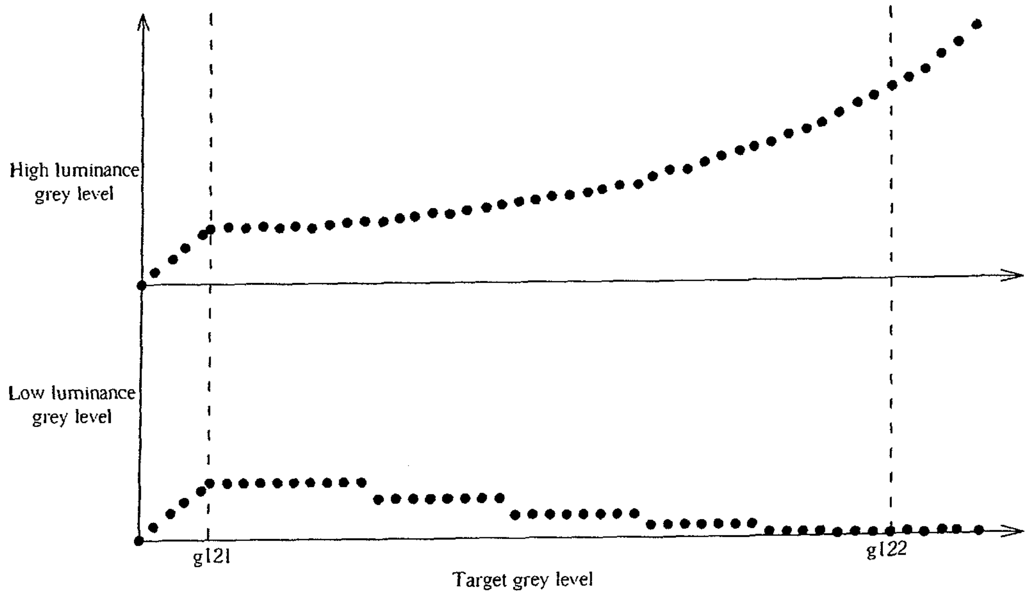

In FIG. 12, when the target value is higher than g122, its corresponding substitute grey levels are assigned in a manner consistent with that when the target value is between g121 and g122. However, when the target value is smaller than g121, both of its corresponding substitute grey levels increase with the target value.

Figure 13:
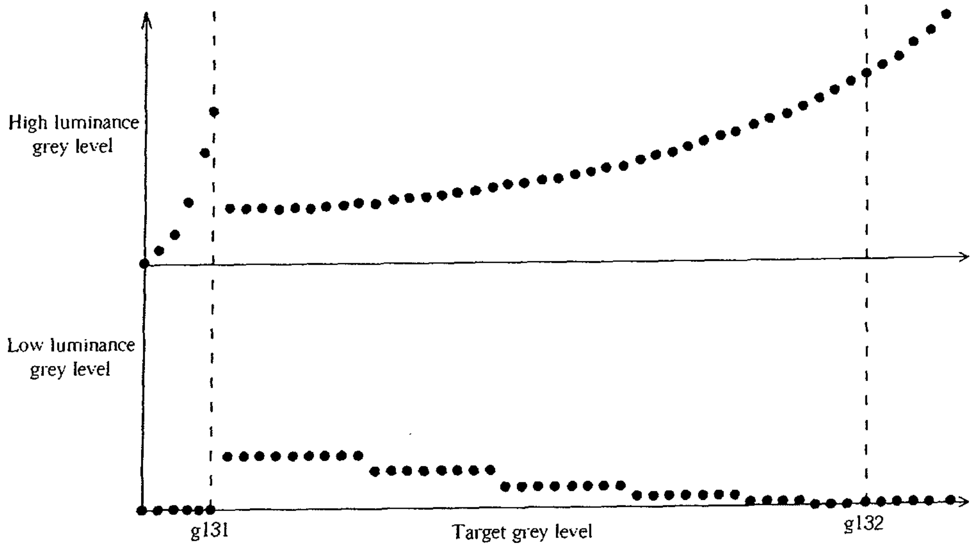

In FIG. 13, similarly to FIG. 12, when the target value is higher than g132, its corresponding substitute grey levels are assigned in a manner consistent with that when the target value is between g131 and g132. however, when the target value is smaller than g131, its corresponding substitute grey level for higher luminance increases significantly with the target value while its corresponding substitute grey level for lower luminance remains constant.

Tables 104, 114, 124, 134 below show specific numeric examples of substitute grey levels in accordance with FIGS. 10-13, respectively.

TABLE 104

| Target grey level | First substitute grey level | Second substitute grey level |
|---|---|---|
| 0 | 0 | 0 |
| 1 | 1 | 1 |
| 2 | 2 | 2 |

TABLE 104-continued

| Target grey level | First substitute grey level | Second substitute grey level |
|---|---|---|
| . | . | . |
| . | . | . |
| . | . | . |
| 21 | 21 | 21 |
| 22 | 22 | 22 |
| 23 | 23 | 23 |
| 24 | 25 | 23 |
| 25 | 27 | 23 |
| . | . | . |
| . | . | . |
| . | . | . |
| 142 | 254 | 0 |
| 143 | 255 | 0 |
| 144 | 255 | 0 |
| 145 | 255 | 2 |
| . | . | . |
| . | . | . |
| . | . | . |
| 234 | 235 | 233 |
| 235 | 235 | 235 |
| 236 | 236 | 236 |
| 237 | 237 | 237 |
| . | . | . |
| . | . | . |
| . | . | . |
| 253 | 253 | 253 |
| 254 | 254 | 254 |
| 255 | 255 | 255 |

TABLE 114

| Target grey level | First substitute grey level | Second substitute grey level |
|---|---|---|
| 0 | 0 | 0 |
| 1 | 2 | 0 |
| 2 | 4 | 0 |
| 21 | 72 | 0 |
| 22 | 80 | 0 |
| 23 | 88 | 0 |
| 24 | 25 | 23 |
| 25 | 27 | 23 |
| . | . | . |
| . | . | . |
| . | . | . |
| 142 | 254 | 0 |
| 143 | 255 | 0 |
| 144 | 255 | 0 |
| 145 | 255 | 2 |
| . | . | . |
| . | . | . |
| . | . | . |
| 234 | 235 | 233 |
| 235 | 235 | 235 |
| 224 | 255 | 156 |
| 228 | 255 | 158 |
| . | . | . |
| . | . | . |
| . | . | . |
| 244 | 255 | 244 |
| 248 | 255 | 250 |
| 255 | 255 | 255 |

TABLE 124

| Target grey level | First substitute grey level | Second substitute grey level |
|---|---|---|
| 0 | 0 | 0 |
| 1 | 1 | 1 |
| 2 | 2 | 2 |
| 3 | 3 | 3 |

TABLE 124-continued

| Target grey level | First substitute grey level | Second substitute grey level |
|---|---|---|
| . | . | . |
| . | . | . |
| . | . | . |
| 41 | 41 | 41 |
| 42 | 42 | 42 |
| 43 | 43 | 43 |
| 44 | 45 | 43 |
| 45 | 46 | 43 |
| 46 | 47 | 43 |
| . | . | . |
| . | . | . |
| . | . | . |
| 253 | 244 | 0 |
| 254 | 252 | 0 |
| 255 | 255 | 0 |

TABLE 134

| Target grey level | First substitute grey level | Second substitute grey level |
|---|---|---|
| 0 | 0 | 0 |
| 1 | 2 | 0 |
| 2 | 5 | 0 |
| 3 | 8 | 0 |
| . | . | 0 |
| . | . | 0 |
| . | . | 0 |
| 41 | 131 | 0 |
| 42 | 136 | 0 |
| 43 | 140 | 43 |
| 44 | 45 | 43 |
| 45 | 46 | 43 |
| 46 | 47 | 43 |
| . | . | . |
| . | . | . |
| . | . | . |
| 253 | 244 | 0 |
| 254 | 252 | 0 |
| 255 | 255 | 0 |

In conclusion, disclosed embodiments of the present invention provide pixel driving method of displaying images in which the substitute grey levels are assigned in consideration of the response time of the liquid crystal material, thus pixels can display images with more consistent luminance and the blur width of motion blur can be minimized. In the embodiment of FIG. 8, the luminance of the pixel at time t82, t84 is equalized with the luminance of the pixel at time t87, t89 to display images at a consistent lower luminance (level L2) throughout the time frames from t80 to t89. In the embodiment of FIG. 9, the luminance of the pixel at time t91, t93 is equalized with the luminance of the pixel at time t96, t98 to display images at a consistent higher luminance (level L4) throughout the time frames from t90 to t99. However, in further embodiments, the luminance may not have to be completely equalized. For example, a reduction from Δy1 to half of Δy1 or Δy2 to half of Δy2 may be acceptable in some cases.

Further the image f82 does not need to follow the image f81, the image fs82 does not need to follow the image fs81, the image f92 does not need to follow the image f91, and the image fs92 does not need to follow the image fs91. When the images fs91, fs92 are consecutive images, then introducing an overdrive value will further improve the displayed image. In particular, overdrive is to provide a higher gray scale value, usually a higher applied voltage, for liquid crystal molecules to improve their response time, so that the image quality can be improved. Moreover, the highest luminance and lowest luminance dictated by the substitute grey levels may be assigned according to the physical feature of a liquid crystal display, i.e., the highest luminance and lowest luminance dictated by the substitute grey levels are not necessarily 255 (white) or 0 (black).

Figure 14:
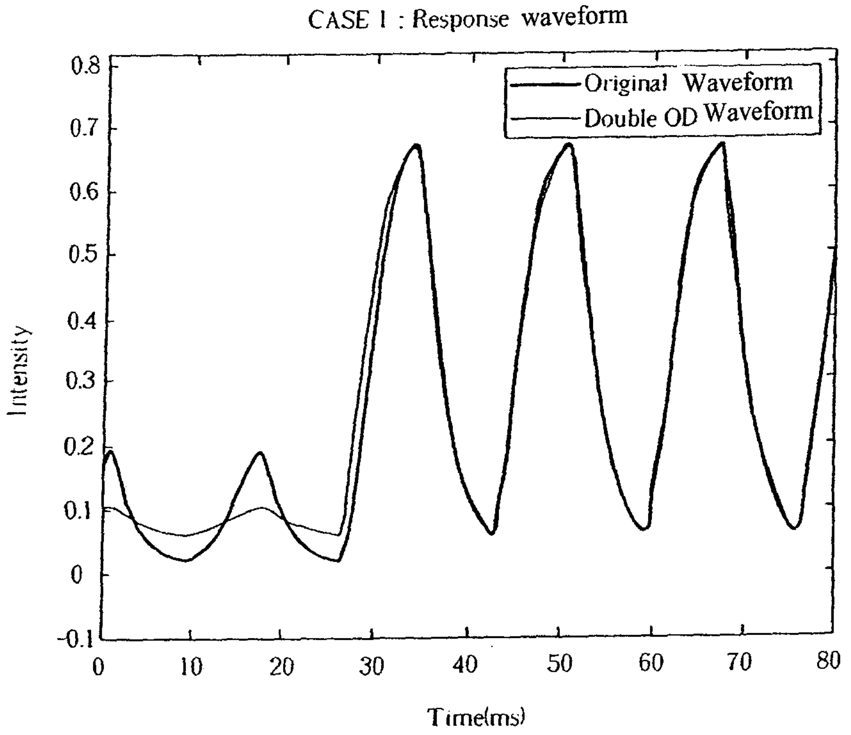
FIGS. 14 and 15 illustrate a simulation result of embodiments of the present invention.
Figure 15:
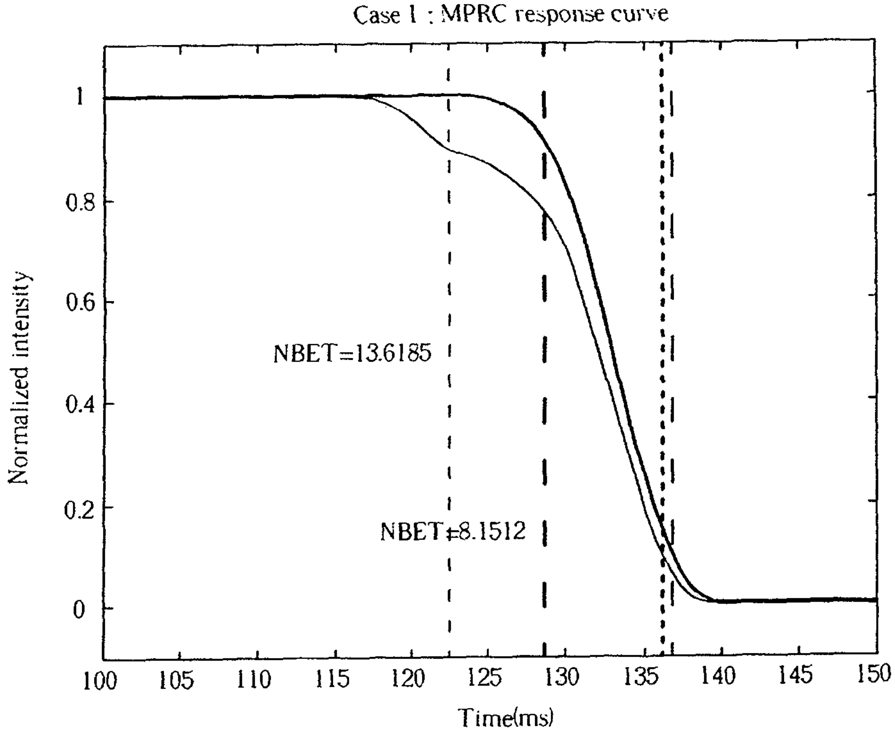

Although FIGS. 10 to 13 illustrate four different embodiments, the invention is not limited to these four embodiments, and should be extended to any embodiment which can maintain the luminance of a pixel consistent and reduce the blur width of motion blur by adjusting the substitute grey levels. Furthermore, the reference luminance for grey level assignment can be determined according to the physical features of the liquid crystal display so as to optimize the assignment. According to simulation results, the pixel driving method of disclosed embodiments of the present invention has effectively reduced the blur width of motion blur. FIGS. 14 and 15 illustrate such simulation results. In FIGS. 14 and 15, MPRC means motion picture response curve, and it is defined in the VESA standard to evaluate the quality for motion pictures. If the transition period of MPRC between high to low intensity is steeper, then it shows less motion blur. NBET stands for normalized blur edge time, and if NBET is smaller, the motion blur is also less.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of the invention.

The invention claimed is:

1. A pixel driving method, comprising:

receiving a first target grey level to be displayed by a pixel during a first frame period;

generating a first higher grey level and a first lower grey level according to the first target grey level and a look up table;

displaying the first higher grey level and the first lower grey level during a first sub-frame period and a second sub-frame period of the first frame period, respectively, wherein accumulated luminance of the first higher grey level over the first sub-frame period of the first frame period and the first lower gray level over the second sub-frame period of the first frame period is equal to accumulated luminance of the first target grey level over the first frame period;

receiving a second target grey level to be displayed by the same pixel during a second frame period, the second frame period being immediately subsequent to the first frame period;

generating a second higher grey level and a second lower grey level according to the second target grey level and the look up table, the second higher grey level being greater than the first higher grey level, and the second lower grey level being smaller than the first lower grey level; and displaying the second higher grey level and the second lower grey level during a first sub-frame period and a second sub-frame period of the second frame period, respectively, wherein accumulated luminance of the second higher grey level over the first sub-frame period of the second frame period and the second lower gray level over the second sub-frame period of the second frame period is equal to accumulated luminance of the second target grey level over the second frame period, wherein said generating the second higher and second lower grey levels are performed to minimize a luminance difference between (i) a luminance of the pixel in accordance with the first lower grey level and (ii) the luminance of the pixel in accordance with the second lower grey level.

2. The method of claim 1, being a pixel driving method of a liquid crystal display.

3. The method of claim 1, wherein the second target grey level is greater than the first target grey level.

4. The method of claim 3, wherein the luminance difference is zero.

5. The method of claim 1, wherein the second target grey level is smaller than the first target grey level.

6. The method of claim 5, wherein the luminance difference is zero.

7. The method of claim 1, further comprising:

receiving a third target grey level to be displayed by the same pixel during a third frame period, said third target gray level being greater than the second target grey level;

generating a third higher grey level and a third lower grey level according to the third target grey level and the look up table, the third higher grey level being greater than or equal to the second higher grey level, the third lower grey level being greater than or equal to the second lower grey level; and displaying the third higher grey level and the third lower grey level during a first sub-frame period and a second sub-frame period of the third frame period, respectively, wherein accumulated luminance of the third higher grey level over the first sub-frame period of the third frame period and the third lower gray level over the second sub-frame period of the third frame period is equal to accumulated luminance of the third target grey level over the third frame period.

8. The method of claim 1, further comprising:

receiving a third target grey level to be displayed by the same pixel during a third frame period, said third target gray level being smaller than the second target grey level;

generating a third higher grey level and a third lower grey level according to the third target grey level and the look up table, the third higher grey level being smaller than or equal to the second higher grey level, the third lower grey level being smaller than or equal to the second lower grey level; and displaying the third higher grey level and the third lower grey level during a first sub-frame period and a second sub-frame period of the third frame period, respectively, wherein accumulated luminance of the third higher grey level over the first sub-frame period of the third frame period and the third lower gray level over the second sub-frame period of the third frame period is equal to accumulated luminance of the third target grey level over the third frame period.

9. The method of claim 1, wherein the first target grey level is lower than the first higher grey level and higher than the first lower grey level; and the second target grey level is lower than the second higher grey level and higher than the second lower grey level.

10. The method of claim 1, wherein the first higher grey level and the first lower grey level are generated based on the look up table in accordance with which the first higher grey level increases and the first lower grey level decreases as the first target grey level increases within a first gray value range, and the first higher grey level decreases and the first lower grey level increases as the first target grey level increases within a second gray value range greater than the first gray value range.

11. The method of claim 10, wherein, in accordance with the look up table, the first higher grey level increases and the first lower grey level remains constant as the first target grey level increases within a third gray value range lower than the first gray value range.

12. The method of claim 1, wherein the first higher grey level and the first lower grey level are generated based on the look up table in accordance with which the first higher grey level increases and the first lower grey level decreases as the first target grey level increases within a first gray value range, and both the first higher grey level and the first lower grey level increases as the first target grey level increases within a second gray value range lower than the first gray value range.

13. The method of claim 1, wherein the first higher grey level and the first lower grey level are generated based on the look up table in accordance with which the first higher grey level increases and the first lower grey level decreases as the first target grey level increases within a first gray value range, and the first higher grey level increases and the first lower grey level remains constant as the first target grey level increases within a second gray value range lower than the first gray value range.

* * * * *